(12) United States Patent
Yoshinaga et al.

(10) Patent No.: US 6,529,391 B2
(45) Date of Patent: Mar. 4, 2003

(54) SWITCHING POWER SUPPLY

(75) Inventors: Mitsutomo Yoshinaga, Saitama-ken (JP); Mizuki Utsuno, Saitama-ken (JP)

(73) Assignee: Sanken Electric Co., Ltd.

( * ) Notice: Subject to any disclaimer, the term of this patent is extended or adjusted under 35 U.S.C. 154(b) by 0 days.

(21) Appl. No.: 10/116,816

(22) Filed: Apr. 5, 2002

(65) Prior Publication Data

US 2002/0145888 A1 Oct. 10, 2002

(30) Foreign Application Priority Data

Apr. 9, 2001 (JP) ........................................ 2001-110299

(51) Int. Cl.[7] .............................................. H02M 3/335
(52) U.S. Cl. ................... 363/21.15; 363/21.16
(58) Field of Search ........................... 363/21.16, 21.15, 363/21.13, 21.17, 21.18

(56) References Cited

U.S. PATENT DOCUMENTS 4,608,625 A * 8/1986 Josephson et al. ........ 363/21.16
5,072,353 A * 12/1991 Feldtkeller ................. 363/20
5,734,564 A * 3/1998 Brkovic ..................... 363/20

* cited by examiner

*Primary Examiner*—Shawn Riley
(74) *Attorney, Agent, or Firm*—Kilpatrick Stockton LLP

(57) ABSTRACT

A switching power supply has a bottom detection circuit (55), which judges whether or not a bottom has been reached, based on a voltage of a capacitor (C9) that determines an off time of a switching element (Q1) that generates a voltage at the secondary side of a transformer (13) and, in the case in which the judgment is made that a bottom has not occurred, a charging voltage for the capacitor (C9) is switched to a high-potential side.

3 Claims, 5 Drawing Sheets

SWITCHING POWER SUPPLY

BACKGROUND OF THE INVENTION

1. Field of the Invention

The present invention relates to a switching power supply of a pseudo-resonance type in which a partial resonance (for example, sinusoidal variation) occurs.

2. Related Art

The switching power supply has a decreased switching frequency, as a load thereof decreases. Accordingly, it suffers a later-described ringing voltage (for example, X1 in FIG. 2) developed therein, as the load is decreased light, whereby the oscillation and output become unstable.

SUMMARY OF THE INVENTION

The present invention was made to solve this problem, and has as an object to provide a switching power supply capable of providing stable oscillation and output even with a light load.

To achieve the above-noted object, according to a first aspect the present invention, there is provided a switching power supply having a switching element, which switches a DC current supplied to a transformer from a DC power supply so as to generate a voltage at the secondary side of the transformer and a capacitor determining the off time of the switching element, wherein when a ringing voltage is generated under a low load, at a time when the voltage is lower than a lower valley part of this voltage, the charging voltage of the capacitor is raised and the off time is extended.

According to a second aspect of the present invention, there is provided a switching power supply having a switching element, which switches a DC current supplied to a transformer from a DC power supply so as to generate a voltage at the secondary side of the transformer and a capacitor determining the off time of the switching element, this switching power supply further having a bottom detection circuit, which determines whether or not a bottom has been reached based on the voltage of the capacitor and a voltage applied to an over-current protection terminal, and a charging voltage switching circuit, which, in a case in which the bottom detection circuit judges that a bottom has been exceeded, switches the voltage applied to the capacitor, and which raises the charging voltage of the capacitor when the bottom is exceeded, so as to extend the off time.

According to a third aspect of the present invention, there is provided a variation on the switching power supply of the second aspect, wherein the bottom detection circuit has a first time period detection circuit, which detects a first time period after which the voltage of the capacitor drops below a first reference value, and a second time period detection circuit, which detects a second time period after which the voltage of the capacitor drops below a second reference value, the switching power supply further having a switching signal generation circuit, which generates a switching signal for a period during which bottom is set to on, outputting this signal to the charging voltage switching circuit.

BRIEF DESCRIPTION OF THE DRAWINGS

The above and other features will be better understood from the exemplary embodiments described below, taken together with the drawings, in which.

DETAILED DESCRIPTION OF THE PREFERRED EMBODIMENTS

Figure 1:
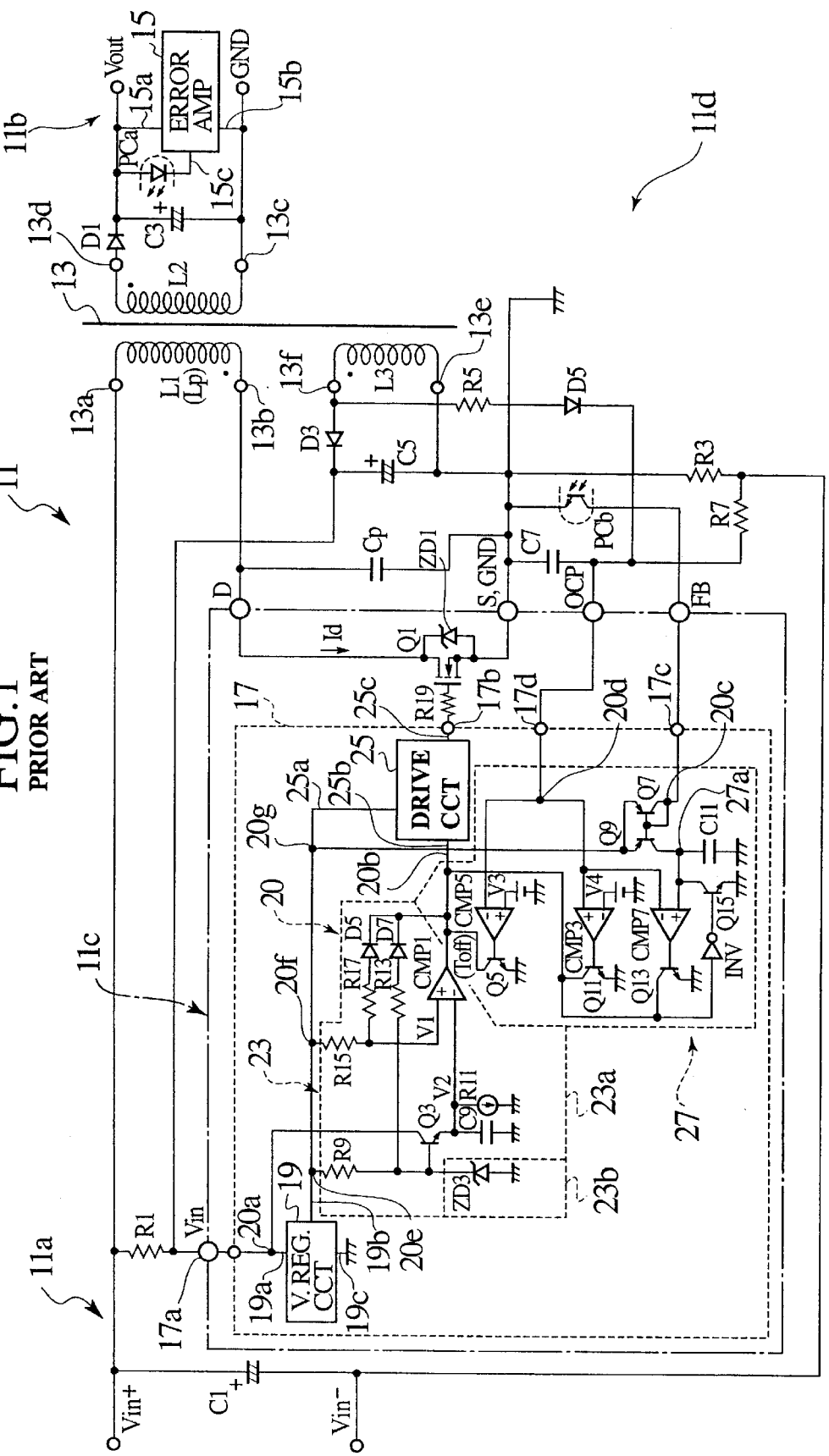
FIG. 1 is a circuit diagram showing the general configuration of a voltage resonance type switching power supply.

There will be described, in the way of comparison for better comprehension, the general configuration and function of a voltage resonance switching power supply 11 (FIG. 1) of a pseudo-resonance type which has some shortcomings, and those of a voltage resonance switching power supply 51 (FIG. 3) of a pseudo-resonance type which is improved as a preferred embodiment of the present invention. Like elements are designated by like reference characters.

FIG. 1 shows the general configuration of the voltage resonance type switching power supply 11.

The switching power supply 11 has a voltage input portion 11a (with later-described C1), a voltage output portion 11b (with later-described Cp,13, D1, C3), a controlled switching portion 11c (including a block defined by one-dash chain lines representing a chassis provided with later-described terminals Vin, D, S, GND, OCP, and FB), and a signal feedback portion 11d (with later-described PCb (and 15, PCa); D5, C7; and D3, C5 (and R1)).

The input portion 11a of the power supply 11 includes a pair of power supply input terminals Vin+ and Vin− connected to a positive pole and a negative pole of an unshown DC power supply, and interconnected through a power supply capacitor C1. A negative-polar one Vin− of the input terminal pair Vin+ and Vin− is connected via a resistor R3 to a later-described ground terminal GND of the feedback portion 11d.

The output portion 11b of the power supply 11 includes a resonating capacitor Cp, and an output transformer 13 having a primary winding L1, a secondary winding L2, and a tertiary winding L3. The primary winding L1 is connected at its one end 13a to a positive-polar one Vin+ of the terminal pair Vin+ and Vin−. The secondary and tertiary windings L2, L3 are both electromagnetically coupled to the primary winding L1. The resonating capacitor Cp has a capacitance resonant with an apparent inductance (Lp) of the primary winding L1.

The switching portion 11c of the power supply includes a field effect transistor Q1 as a switching element, and a switching controller 17 therefor, which will be detailed later. The field effect transistor Q1 has a "terminal D connected to the drain" (hereinafter simply referred to as "drain D"), a "a terminal S connected to the source" (hereinafter simply referred to as "source S"), and a "terminal connected to the gate" (hereinafter simply referred to as "gate"). The drain D is connected to the other end 13b of the primary winding L1. The drain D and source S are interconnected through the resonating capacitor Cp connected in parallel to the field effect transistor Q1, with a zenor diode ZD1 connected in parallel thereto. The gate is connected via a resistor R19 to a drive signal output terminal 17b of the switching controller 17. The source S is grounded, to serve as a ground terminal GND of the feedback portion 11d, as well as of the switching portion 11c.

In the output portion 11b, the secondary winding L2 of the transformer 13 is connected at its one end 13d (in phase with 13b) to an anode of a rectifying diode D1, of which a cathode is connected to a positive-polar terminal of a smoothing capacitor C3, and a voltage output terminal Vout of the power supply 11. The other end 13c of the secondary winding L2 is connected to a negative-polar terminal of the smoothing capacitor C3, and a grounded output terminal GND of the output portion 11b, which terminal GND has a common ground potential to the ground terminal GND of the feedback portion 11d.

The feedback portion 11d serves for: an output detection signal feedback from a secondary (L2) side of the transformer 13 in the output portion 11b to some drive control elements (FB→Q7, Q9) of the switching portion 11c, i.e. L2 ⇒FB; a status monitoring signal feedback from a tertiary (L3) side of the transformer 13 to some drive control elements (OCP→CMP5, CMP3, CMP7) of the switching portion 11c, i.e. L3⇒OCP; and a timing comparison signal feedback from the tertiary (L3) side of the transformer 13 to an input end (Vin→Q3) of the switching portion 11c, i.e. L3 ⇒Vin.

For the detection signal feedback (L2→FB), the feedback portion 11d has: an error amplifier 15, which is connected at an input terminal 15a thereof to the output terminal Vout of the output portion 11b, and at a ground terminal 15b thereof to the ground terminal GND of the output portion 11b; a photo-coupler PCa composed of a light-emitting element, which is connected at an anode thereof to the output terminal Vout of the output portion 11b, and at a cathode thereof to an output terminal 15c of the error amplifier 15; and a mating photo-coupler PCb composed of a phototransistor, which is connected between a feedback terminal FB to the switching controller 17 and the ground terminal GND of the feedback portion 11d. The output terminal Vout of the power supply 11 has an output voltage, which is detected by the error amplifier 15, which outputs a signal responsive in level to the detected voltage, which signal is optically fed back via the photo-coupler PCa to the mating photo-coupler PCb, whereby an optically received feedback signal is input via a terminal 17c to the switching controller 17, where it is applied to a "terminal connected to the collector" (hereinafter simply called "collector") of a later-described transistor Q7.

For the monitoring signal feedback (L3⇒OCP), the feedback portion 11d has: a diode D5 connected at its anode via a resistor R5 to one end 13f (in phase with 13b) of the tertiary winding L3 of the transformer 13, and at its cathode to an over-current protection terminal OCP of the switching portion 11c, which terminal OCP is connected via a resistor R7 to the negative-polar input terminal Vin− of the input portion 11a; and a capacitor C7 connected between the over-current protection terminal OCP and the ground terminal GND of the feedback portion 11d. It is noted that the other end 13e of the tertiary winding L3 is connected to the ground terminal GND. The above-noted end 13f of the tertiary winding L3 has a voltage representative of a working status of the transformer 13, i.e. an outputting condition of the power supply 11. When the field effect transistor Q1 as a switching element is off, the capacitor C7 is charged with a voltage developed at the end 13f of the tertiary winding L3, whereby the over-current protection terminal OCP has a raised potential, which is fed, via the over-current protection terminal OCP and an associated terminal 17d, to the switching controller 17, where it is applied to a (−) input terminal of a later-described comparator CMP5, a (+) input terminal of a later-described comparator CMP3, and a (−) input terminal of a later-described comparator CMP7.

For the comparison signal feedback (L3⇒Vin), the feedback portion 11d has: a diode D3 connected at its anode to the above-noted end 13f of the tertiary winding L3 of the transformer 13, and at its cathode to a voltage input terminal Vin of the switching portion 11c; a capacitor CS connected between the cathode of the diode D3 and the ground terminal GND; and a resistor R1 connected between the positive-polar terminal Vin+ of the input portion 11a and the voltage input terminal Vin of the switching portion 11c.

With the field effect transistor Q1 off, a voltage generated in the tertiary winding L3 is rectified by the diode D3 to charge the capacitor C5, whereby the voltage input terminal Vin of the switching portion 11c has a corresponding voltage developed thereon relative to a ground potential. Thus developed voltage is fed, via an input terminal 17a, to the switching controller 17, where (as a transistor Q3 is on) the fed voltage charges a later-described capacitor C9 to provide a voltage V2 to be compared with a reference voltage V1.

There will be described below the internal configuration and actions of the switching controller 17, with reference to FIG. 1 and FIG. 2. Those actions associated with operations particular to the pseudo-resonance type of switching power supply will be separately described later.

The switching controller 17 includes as internal circuitry thereof: a voltage regulating circuit 19 having a power input terminal 19a connected to the input terminal 17a of the switching controller 17, a reference voltage output terminal 19b, and a grounded terminal 19c; a switching element drive circuit 25 having a reference voltage input terminal 25a connected to the output terminal 19b of the voltage regulating circuit 19, a drive control signal input terminal 25b, a switching element drive signal output terminal 25c connected via the output terminal 17b of the switching controller 17 and the resistor R19 to the gate of the field effect transistor Q1, and an unshown grounded terminal; and a drive controller 20 having three feedback signal input terminals 20a, 20c, and 20d connected to the terminals 17a, 17c, and 17d of the switching controller 17a, a drive control signal output terminal 20b connected to the signal input terminal 25b of the drive circuit 25, a number of reference voltage input terminals 20e, 20f, and 20g connected to the output terminal 19b of the voltage regulating circuit 19 for internal supply of reference voltage, and a necessary number of grounded terminals.

The voltage regulating circuit 19 is thus connected at the input terminal 19a, via the voltage input terminal Vin of the switching portion 11c, to a (+) electrode of the capacitor C5 in the feedback portion 11d, and at the output terminal 19b to the reference voltage input terminal 25a of the drive circuit 25. It is noted that the voltage regulating circuit 19 outputs a stabilized internal reference voltage (to be V1).

The drive controller 20 is configured with: a "drive control signal generator formed as an off time generating circuit" (hereinafter simply called "off time generator") 23 for generating a "drive control signal in terms of a control signal to be supplied for controlling the drive circuit 25 to drive or hold the field effect transistor Q1 into or in an off state" (hereinafter sometimes referred to as "internal off time signal" or "signal of internal off time") Toff; and a "drive control signal trimmer formed as an internal off time interrupting circuit" (hereinafter simply called "off time interrupter") 27 for interrupting the supply of internal off time signal to thereby trim a duration thereof in accordance with working conditions of the output portion 11b.

The off time generator 23 is configured with a signal forming circuit 23a for forming the internal off time signal Toff, and a voltage holding circuit 23b composed of a zener diode ZD3 for providing a safe-held reference voltage to the gate of the transistor Q3 as a switching element in the signal forming circuit 23a.

The signal forming circuit 23a has: the switching transistor Q3, which is connected at the collector to the signal input terminal 20a of the drive controller 20, at the emitter to a timing-controlling parallel connection (C9/R11) of a capacitor C9 and a constant current source as a resistor R11, and at the base between the zener diode ZD3 and one end of a resistor R9 of which the other end is connected to the reference voltage input terminal 20e of the drive controller 20; a comparator CMP1, which is connected at a (+) input terminal thereof to one end of a resistor R15 of which the other end is connected to the reference voltage input terminal 20f of the drive controller 20, at a (−) input terminal thereof to the parallel connection of capacitor C9 and resistor R11, and at an off-time outputting terminal thereof to the drive control signal output terminal 20b of the drive controller 20; and a reference supplying pair of diodes D5 and D7, which are connected at anodes thereof via resistors R17 and R13 to the above-noted one-ends of the resistors R15 and R9, respectively, and at cathodes thereof to the output terminal of the comparator CMP1.

The signal of internal off time Toff has a period determined in dependence on a time constant established by the parallel connection of capacitor C9 and resistor R11 connected both between a grounded conductor and the emitter of the transistor Q3. The transistor Q3 has a base voltage supplied from the output terminal 19b of the voltage regulating circuit 19 through the resistor R9 and held by the zenor diode ZD3.

Figure 2:
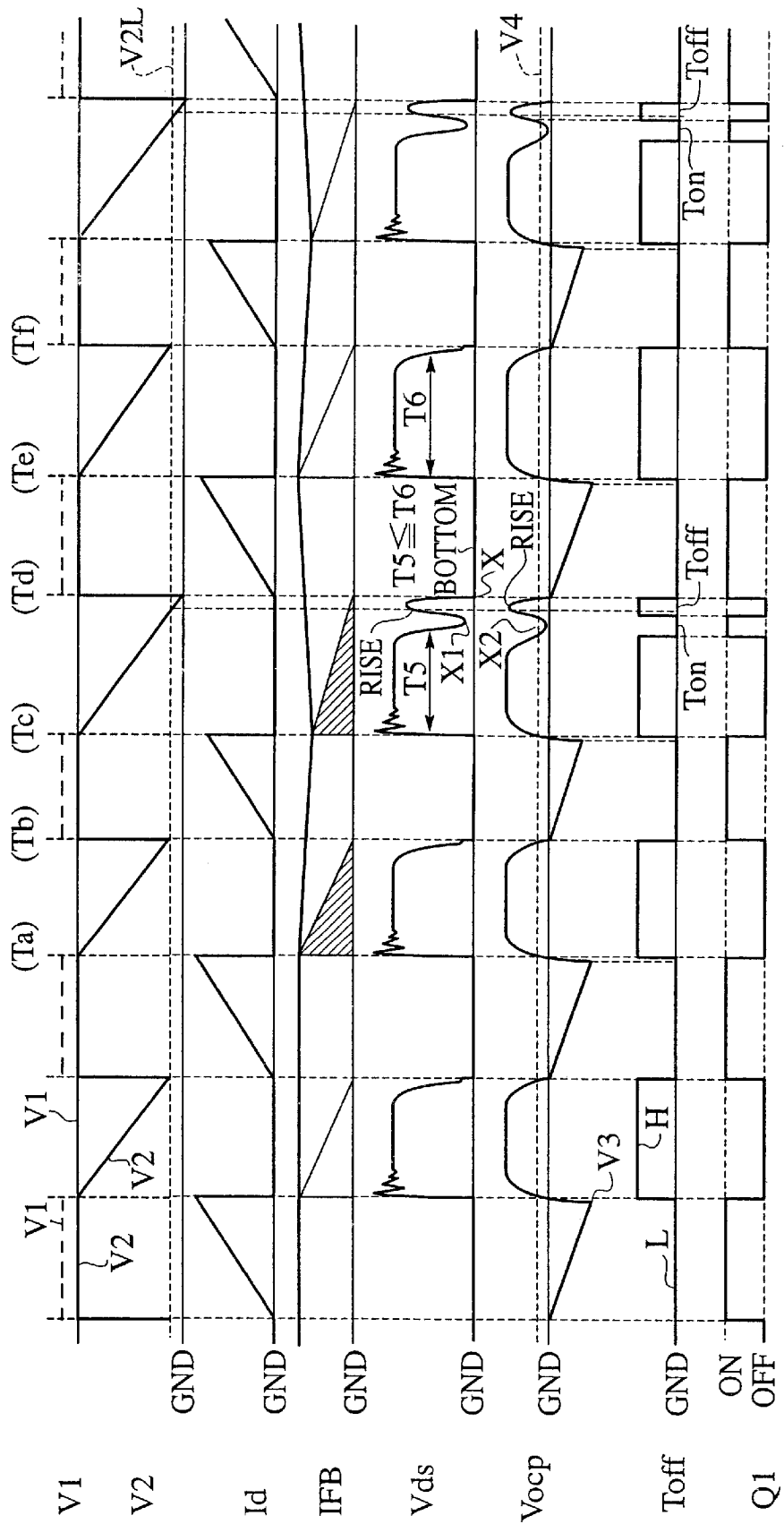
FIG. 2 is a timing chart illustrating operation of the switching power supply of FIG. 1.

As illustrated in FIG. 2, after lapse of every on state of the internal off time Toff, the transistor Q3 has an emitter voltage V2 dropping below the reference voltage V1, depending on a voltage across the capacitor C9. This emitter voltage V2 is supplied to the (−) input terminal of the comparator CMP1, whereby the comparator CMP1 enters a phase of high level H, i.e. an on state, with respect to the internal off time Toff, which (H) is output from the control signal output terminal of the comparator CMP1, via the output terminal 20b of the drive controller 20, to the control signal input terminal 25b of the drive circuit 25.

On the other hand, as shown in FIG. 1, the off time interrupter 27 includes three comprators CMP3, CMP5, and CMP7, a parallel connection of a capacitor C11 and a switching transistor Q15, and a current mirror circuit composed of a pair of transistors Q7 and Q9.

The comparator CMP3 has: the (+) input terminal connected, via the feedback input terminal 20d of the drive controller 20 and the input terminal 17d of the switching controller 17, to the over-current protection terminal OCP of the switching portion 11c; a (−) terminal connected to a positive electrode of a cell or power supply which supplies a reference voltage V4 that is preset to an off-time control potential (for example 0.3V in FIG. 2); and an output terminal connected to the base of a switching transistor Q11 connected between the output terminal 20b of the drive controller 20 and a grounded conductoL The comparator CMP5 has: the (−) input terminal connected, via the terminals 20d and 17d, to the over-current protection terminal OCP of the switching portion 11c; a (+) terminal connected to a positive electrode of a cell or power supply which supplies a reference voltage V3 that is preset to an off-time control potential (for example −0.73V in FIG. 2); and an output terminal connected to the base of a switching transistor Q5 connected between the output terminal 20b of the drive controller 20 and a grounded conductor.

The comparator CMP7 has: the (−) input terminal connected, via the terminals 20d and 17d, to the over-current protection terminal OCP of the switching portion 11c; a (+) terminal connected to a terminal 27a between the parallel connection of capacitor C11 and transistor Q15 and the mirror circuit of transistors Q7 and Q9; and an output terminal connected to the base of a switching transistor Q13 connected between the output terminal 20b of the drive controller 20 and a grounded conductor.

The parallel connection of capacitor C11 and transistor Q15 is connected between the above-noted terminal 27a and a grounded conductor. It is noted that the output terminal 20b of the drive controller 20 is connected to respective collectors of the transistors Q11 and Q13, and to an input terminal of an inverter INV of which an output terminal is connected to the gate of the transistor Q15.

In the current mirror circuit, the transistor Q7 is connected at the collector to the gates of transistors Q7 and Q9 and to the signal feedback terminal FB of the switching portion 11c, via the feedback input terminals 20c and 17c of the drive controller 20 and the switching controller 17, and at the emitter to the emitter of the transistor Q9. The transistor Q9 is connected at the emitter to the reference voltage input terminal 20g of the drive controller 20, and at the collector to the abovve-noted terminal 27a. The transistors Q7 and Q9 cooperates with each other so, if a current flows from the collector of the transistor Q7 towards the photo-coupler PCb of the feedback portion 11d, a proportional current of a fixed ratio is then caused to flow from the collector of the transistor Q9 towards the terminal 27a, charging the capacitor Cii.

In the Figures, designated by reference character Vocp is a potential at the over-current protection terminal OCP in FIG. 1, Vds is a potential difference between the drain D and the source S of the field effect transistor Q1, Id is a drain current of the transistor Q1, and IFB is a current conducted through the feedback terminal FB.

When the potential Vocp at the over-current protection terminal OCP falls, if it reaches an off-time control potential (for example −0.73 V) preset as the voltage V3, then the comparator CMP5 outputs an on signal to the base of the switching transistor Q5, thereby placing this transistor Q5 in an on state, so that the control signal input terminal 25b of the drive circuit 25 has a grounded potential, whereby the drive circuit 25 is controlled to drive the switching transistor Q1 into an off state, where it conducts no drain current Id, and the potential difference Vds across the transistor Q1 is determined by charges stored in the capacitor Cp.

When the potential Vocp at the over-current protection terminal OCP rises, if it reaches another off-time control potential (for example 0.3 V) preset as the voltage V4, the comparator CMP3 outputs an on signal to the base of the switching transistor Q11, thereby placing this transistor Q11 in an on state, so that the control signal input terminal 25b of the drive circuit 25 has a grounded potential, whereby the drive circuit 25 is controlled to drive the switching transistor Q1 into the off state.

If the capacitor C11 is charged to a voltage exceeding the potential Vocp at the over-current protection terminal OCP, the comparator CMP7 outputs an on signal to the base of the switching transistor Q13, thereby placing this transistor Q13 in an on state, so that the control signal input terminal of the drive circuit 25 has a grounded potential, whereby the drive circuit 25 is controlled to drive the switching transistor Q1 into the off state.

The drive circuit 25 thus receives an alternative one of an on signal level of a high potential H and an off signal level of a ground potential L, and outputs a signal of corresponding on/off level, via the resistor R19, to the gate of the field effect transistor Q1 serving as a switching element of the power supply 11.

The control signal input terminal 25b of the drive circuit 25 thus has an on-off controlled signal level, which is input to the inverter INV, where it is inverted. If the input level is of an off signal, the output terminal of the inverter INV has a high signal level, which is input to the base of the switching transistor Q15, thereby placing this transistor Q15 in an on state, whereby the charged capacitor C11 is discharged.

Description will now be made of operation of the pseudo-resonance type witching power supply 11.

First, during an internal off time (Toff H) depending on the time constant established by the parallel connection of capacitor C9 and resistor R11 connected to the emitter of the switching transistor Q3, as the stored charge in the capacitor C9 is discharged through the resistor R11, the voltage V2 drops to a preset level, for example 1.2V, when the comparator CMP1 turns on (Toff L), whereby the drive circuit 25 is controlled to drive the switching transistor Q1 into an on state, where the potential difference Vds is zero, allowing for an increasing drain current Id to be conducted through the primary winding L1 of the transformer 13.

As the switching transistor Q1 is in the on state, the tertiary winding L3 of the transformer 13 has a voltage developed thereacross, and the capacitor C7 is charged via the resistor R7 to a voltage equivalent to a voltage drop across the current detection resistor R3 connected in parallel thereto, causing the over-current protection terminal OCP to have a dropping potential Vocp relative to the ground level. When this potential Vocp reaches the off-time control potential V3 (for example, −0.73 V), an on signal is output from the comparator CMP5 to the base of the switching transistor Q5, thereby turning this switching transistor Q5 on at a time Ta (FIG. 2), which places the input terminal 25b of the drive circuit 25 at the ground potential, thereby switching the switching transistor Q1 off.

Then, during the period of this off time, the capacitor C9 in the signal forming circuit 23 discharges via the resistor R11, causing the voltage V2 to decrease. When this voltage V2 falls to the preset level V2L (for example 1.2 V), the comparator CMP1 is switched on. As a result, the switching transistor Q1 is set to the on state via the drive circuit 25, at a time Tb (FIG. 2).

It is now assumed that, along with the above action, the load is significantly reduced light, so that the output voltage Vout of the output portion 11b rises, and a detection signal of this rise is fed back via the photo-coupler PCa and the mating photo-coupler PCb in the feedback portion 11d, whereby the one transistor Q7 of the current mirror circuit in the switching portion 11c has a greater current IFB than prescribed conducted therefrom, via the terminals 20c, 17c, and FB, to the collector of the photo-transistor of the photo-coupler PCb.

Therefore, a proportional current of a given ratio is conducted from the collector of the other transistor Q9 of the current mirror circuit, through the terminal 27a, quickly charging the capacitor C11, whereby an on signal is output from the comparator CMP7 to the base of the switching transistor Q13, thereby placing this transistor Q13 in the on state, so that the signal input terminal 25b of the drive circuit 25 is placed at the ground potential, and the switching transistor Q1 is placed in the off state, at a time Tc (FIG. 2). If the load is light, the on time Ton (FIG. 2) thus becomes shorter than when the load is heavy.

In this connection, in the case in which the load is significantly light so that the falling edge of a voltage developed across the primary winding L1 of the transformer 13 is accelerated, if the switching transistor Q1 is driven into an off state before the internal off time Toff elapses, there is caused a resonance by combination of the inductance Lp of the primary winding L1 and the capacitance of the capacitor Cp connected between the drain D and the source S of the switching transistor Q1, accompanying a free oscillation, with which a ringing in voltage Vds is generated, as shown at a point X1 in FIG. 2, resulting in a sudden rise of voltage Vds before this voltage Vds drops to a bottom potential, at a time Td (FIG. 2). In the same manner, the potential on the over-current protection terminal OCP also rises before dropping to the ground potential, as shown at a point X2 in FIG. 2.

As a result of the above, near the time Td, even if the internal off time has elapsed, the operation of the comparator CMP3 forcibly holds the off state, after which when the resonant voltage drops to a prescribed value, the switching transistor Q1 is switched on.

Because the output voltage Vout of at the secondary side drops, even though the load is light, the comparator, having the usual feedback signal applied thereto, operates the same as when the load is heavy. That is, when the potential Vocp on the over-current protection terminal OCP drops and reaches the off-time control voltage V3 (for example, −0.73 V), the comparator CMP5 brings the input terminal 25b of the drive circuit 25 to the ground potential, so that the switching transistor Q1 is turned off, at a time Te (FIG. 2).

Because the output voltage Vout at the secondary side of the transformer 13 drops, there is an accompanying retardation in the dropping of the voltage on the primary winding L1. During the above-noted internal off time period, the charge on the capacitor C9 is discharged via the resistor R11, and when the voltage thereof drops to the voltage V2 (for example, 1.2 V), the comparator CMP1 switches on, and the switching transistor Q1 is set to the on state via the drive circuit 25, at a time Tf (FIG. 2).

However, because the actual load is light, the output voltage Vout rises again, a greater current than prescribed is caused to flow from the collector of the transistor Q7 of the current mirror circuit via the feedback terminal FB towards the photocoupler PCb connected to the photo-coupler PCa, simultaneously with which the capacitor C11 is charged from the collector of the transistor Q9 of the current mirror circuit, so that the comparator CMP7 inputs an off signal to the input terminal 25b of the drive circuit 25, resulting in the switching transistor Q1 placed in the off state.

Thus, a circuit configured as described in detail above exhibits repeated rise and fall of the secondary side output voltage Vout, resulting in instability.

Figure 3:
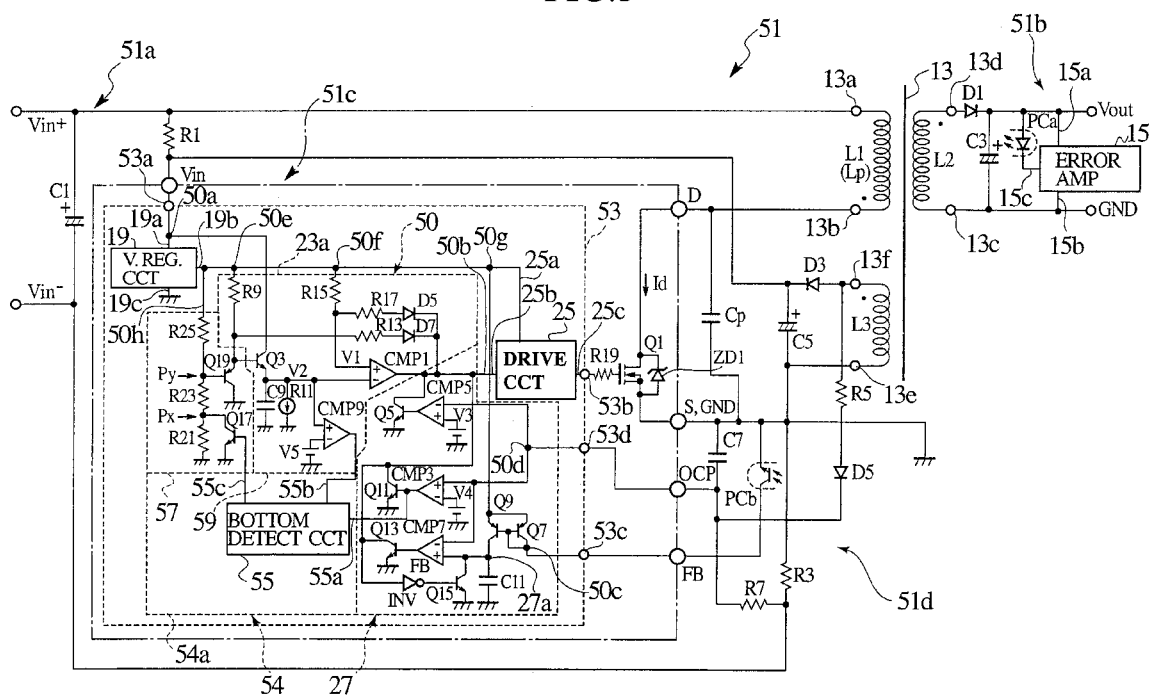
FIG. 3 is a circuit diagram showing the general configuration of a voltage resonance type switching power supply according to an embodiment of the present invention.

FIG. 3 shows the switching power supply 51 of improved voltage resonance type according to an embodiment of the present invention. Like elements and legends to the power supply 11 are designated by like reference characters to FIG. 1.

In the present invention, under light load conditions of 50% or so, operation occurs over one cycle of ringing, and in order to solve the problem of instability resulting from a repetition of one cycle of ringing with the no-ringing condition, as occurred in the past, the charging voltage for the capacitor C9, which serves to establish the internal off time is caused to rise, thereby lengthening the internal off time, a circuit configuration such as shown in FIG. 3, for example, being used to achieve this lengthening of the internal off time.

Like the switching power supply 11, the switching power supply 51 has a voltage input portion 51a (with C1), a voltage output portion 51b (with Cp,13, D1, C3), a controlled switching portion 51c (including a block defined by one-dash chain lines representing a chassis provided with terminals Vin, D, S, GND, OCP, and FB), and a signal feedback portion 51d (with PCb (and 15, PCa); D5, C7; and D3, C5 (and R1)).

The input portion 51a, output portion 51b, and feedback portion 51d of the power supply 51 are analogous to the input portion 11a, output portion 11b, and feedback portion 11d of the power supply 11, respectively.

The switching portion 51c of the power supply 51 includes a field effect transistor Q1 as a switching element, and a switching controller 53 therefor.

The field effect transistor Q1 has a drain D, a source S, and a gate. The drain D is connected to an end 13b of a primary winding L1 of a transformer 13. The drain D and source S are interconnected through a resonating capacitor Cp connected in parallel to the field effect transistor Q1, with a zenor diode ZD1 connected in parallel thereto. The gate is connected via a resistor R19 to a drive signal output terminal 53b of the switching controller 53. The source S is grounded, to serve as a ground terminal GND of the feedback portion 51d, as well as of the switching portion 51c.

The switching controller 53 of the switching portion 51c has three feedback signal input terminals 51a, 53c, and 53d, and a switching element drive signal output terminal 53b, which correspond to the feedback signal input terminals 11a, 11c, and 11d and switching element drive signal output terminal 11b of the switching portion 11c, respectively.

The switching controller 53 includes as internal circuitry thereof: a voltage regulating circuit 19 having a power input terminal 19a connected to the input terminal 53a of the switching controller 53, a reference voltage output terminal 19b, and a grounded terminal 19c; a switching element drive circuit 25 having a reference voltage input terminal 25a connected to the output terminal 19b of the voltage regulating circuit 19, a drive control signal input terminal 25b, a switching element drive signal output terminal 25c connected via the output terminal 53b of the switching controller 53 and the resistor R19 to the gate of the field effect transistor Q1, and an unshown grounded terminal; and a drive controller 50 having three feedback signal input terminals 50a, 50c, and 50d connected to the terminals 53a, 53c, and 53d of the switching controller 53, a drive control signal output terminal 50b connected to the signal input terminal 25b of the drive circuit 25, a number of reference voltage input terminals 50e, 50f, 50g, and 50h connected to the output terminal 19b of the voltage regulating circuit 19 for internal supply of reference voltage, and a necessary number of grounded terminals. The terminals 50a, 50b, 50c, 50d, 50e, 50f, and 50g of the drive controller 50 correspond to the terminals 20a, 20b, 20c, 20d, 20e, 20f, and 20g of the drive controller 20, respectively.

The drive controller 50 is configured with an off time generator 54, and an off time interrupter 27.

The off time generator 54 is configured with a signal forming circuit 23a for forming an off time signal, and a period extending circuit 54a for extending a period of the off time signal to be formed. It is noted that the switching power supply 51 is different from the switching power supply 11 in that the voltage holding circuit 23b of the latter 11 is replaced by the period extending circuit 54a in the former 51, subject to provision of the reference input terminal 50h.

The period extending circuit 54a is configured with a comparison circuit 59 for comparing a voltage across a capacitor C9 with a preset voltage V5 (for example 2V), a bottom detection circuit 55 for responding to an inverted output of the comparison circuit 59 by detecting a bottom of a ringing voltage, as this voltage is developed with a light load, and a charging voltage switching circuit 57 for responding to a detected bottom of the ringing voltage by switching a charging voltage of the capacitor C9.

The comparison circuit 59 is configured with a comparator CMP9, which has a (+) input terminal connected to a parallel connection of capacitor C9 and resistor R11 in the signal forming circuit 23a, a (−) input terminal connected to a positive electrode of a cell or power supply that supplies the preset voltage V5, and an output terminal.

The bottom detection circuit 55 has an input terminal 55a connected to an output terminal of a comparator CMP3 in the off-time interrupter 27, an input terminal 55b connected to the output terminal of the comparator CMP9 in the comparison circuit 59, and an output terminal 55c connected to the base of a switching transistor Q17 in the charging voltage switching circuit 57.

The charging voltage switching circuit 57 is configured with: a serial connection of three resistors R21, R23, and R25 connected between the reference voltage input terminal 50h and a grounded conductor; the switching transistor Q17 of which the collector is connected to a point Px as a node between the resistors R21 and R23, and the emitter is grounded; and a switching transistor Q19 of which the base is connected to a point Py as a node between the resistors R23 and R25, the collector is grounded, and the emitter is connected between the gate of a switching transistor Q3 of the signal forming circuit 23a and a resistor R9 connected to the reference voltage input terminal 50g.

A voltage of the capacitor C9 used to set the internal off time is input to an input of a comparator CM9, the output of which inverts approximately 3 μs before the internal off time when the voltage on this capacitor C9 drops below V5 (for example, 2 V).

By monitoring the voltage resonance signal during the inversion time of the comparator CMP9, a judgment is made as to whether or not a pseudo-resonance signal went through a fall immediately before the end of the internal off time.

An output signal from the comparator C9, which detects the period of time during which the voltage on the capacitor C9 is below V5, and an output signal of comparator CMP3, which detects the period of time during which the voltage applied to the over-current protection terminal OCP is 0 V, are connected to the bottom detection circuit 55, which based on these output signals makes a judgment as to whether or not a bottom has been reached, and generates a switching signal during the time that bottom is on. The bottom detection circuit 55 in this case has a switching signal generation circuit that generates and outputs to the charging voltage switching circuit 57 a switching signal during the bottom on period, based on the output signal from the comparator CMP9 and the output signal from the comparator CMP3.

If the bottom detection circuit 55 detects the bottom, the charging voltage switching circuit 57 switches the charging voltage that is applied to the capacitor C9.

Specifically, in the case in which the bottom detection circuit judges that the bottom has been reached, it applies a high-level signal to a transistor Q17, thereby switching this transistor to the on state, causing the grounding of the point Px, the application of a voltage Vpy (for example 4 V), which is derived by voltage division of the output voltage from the voltage regulating circuit 19 between the resistors R25 and R23, and the generation of a voltage Vpy+Vbe on the emitter of the transistor Q19, which is input to the base of the transistor Q3. Additionally, a voltage Vpy+Vbe+Vbe is developed at the emitter of the transistor Q3 (between the base and emitter of this transistor), and the capacitor C9 is charged by the voltage Vpy (for example, 4 V).

In the case in which the bottom detection circuit 55 judges that the bottom has not been reached, a low-level switching signal from the bottom detection circuit 55 is applied to the base of the transistor Q17, thereby turning this transistor off, so that the point Px is grounded via the resistor R12, a voltage Py (for example, 5 V), derived by voltage division of the output voltage from the voltage regulating circuit 19 between the resistors R23 and R23+R25 being applied to the point Py, and a voltage Vpy+Vbe (base-emitter voltage) being generated at the emitter of the transistor Q19, this being applied to the base of the transistor Q3. A voltage Vpy+Vbe−Vbe (base-emitter voltage of Q3) is generated at the emitter of the transistor Q3, and the capacitor C9 is charged by the voltage Vpy (for example, 5 V).

The capacitor C9, therefore, is charged by 4 V, for example, in the bottom on condition, this being increased by Δ V (for example, 1 V) to 5 V if the bottom on condition has not occurred, thereby extending the internal off time period. As a result, the bottom on condition occurs.

Figure 4:
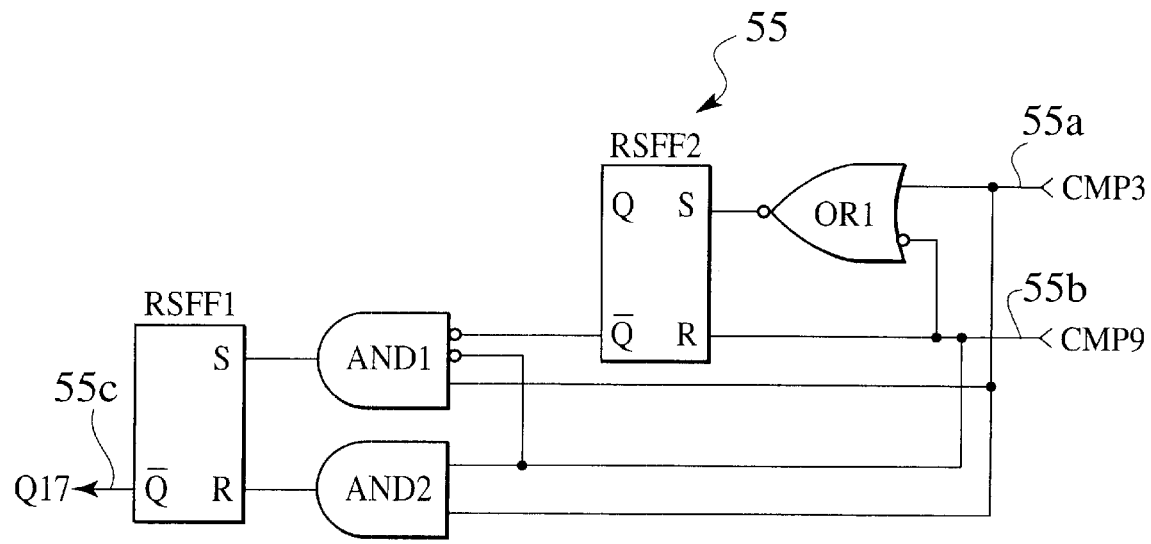
FIG. 4 is a block diagram showing the internal configuration of a bottom detection circuit of the switching power supply of FIG. 3.

The internal configuration of the bottom detection circuit shown in FIG. 4 is described with reference to the timing chart of FIG. 5, and the basic operation of the bottom detection circuit 55 is described below.

In the bottom detection circuit 55, the output from the comparator CMP3 is input to OR1, AND1, and AND3, and during a time period in which the potential on the overcurrent protection terminal OCP rises to above the off-time control voltage V4 (for example, 0.3 V), a high-level signal is input to the OR1, AND1 and AND2, as shown in FIG. 3. The voltage level of a pseudo-resonance signal is monitored by the comparator CMP3 and, as indicated at time Tg in FIG. 5, a high-level signal is output therefrom during a time period in which the pseudo-resonance signal exceeds V4.

Figure 5:
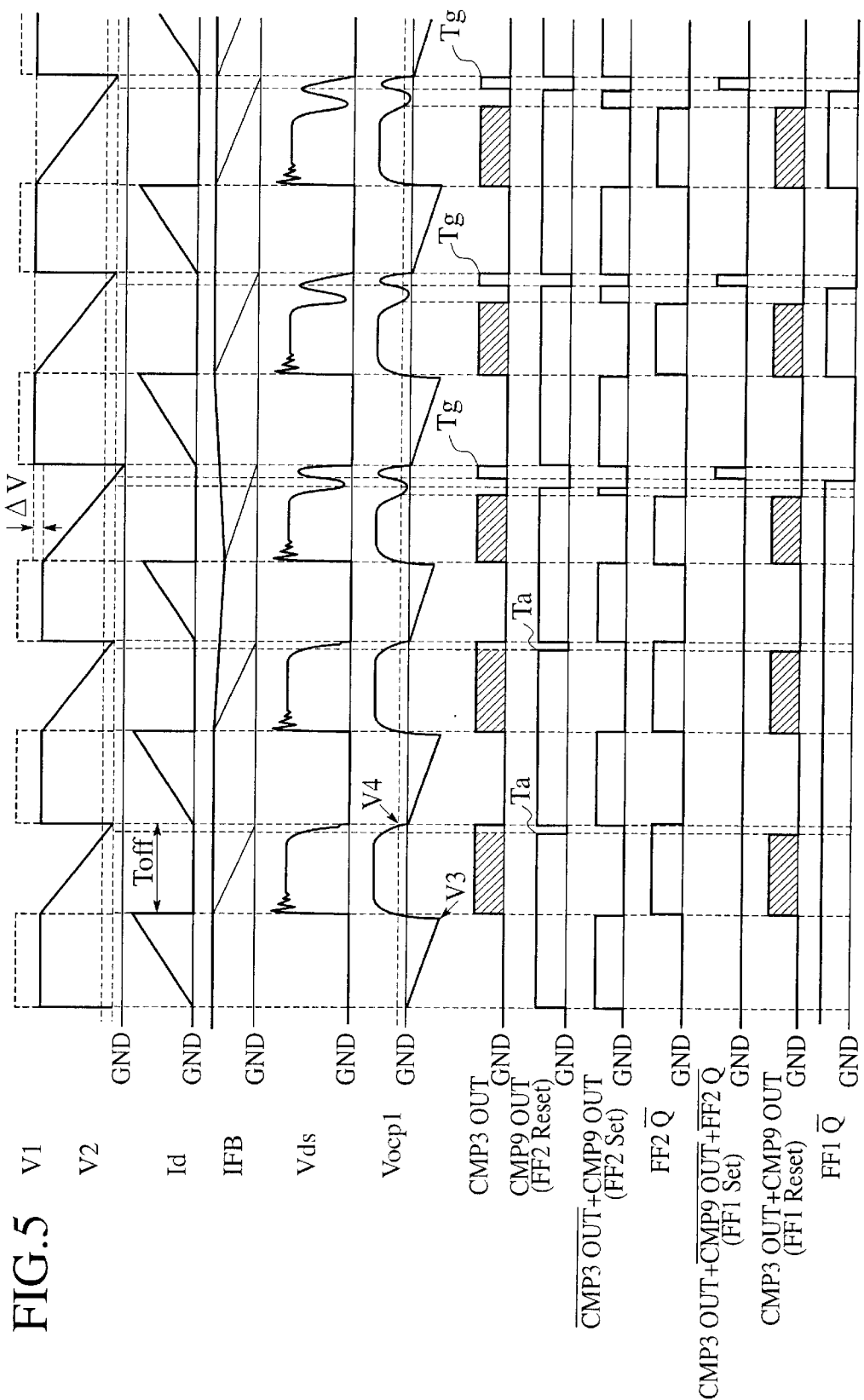
FIG. 5 is a timing chart illustrating operation of the switching power supply of FIG. 3.

The output from the comparator CMP9 is input to the OR1, AND1, and AND2, and during a time period in which the potential V2 of the capacitor C9 drops, so that this potential is below the off-time control potential V5 (for example, 2 V), the comparator outputs a high-level signal to the OR1, AND1, and AND2, as shown in FIG. 5.

Additionally, the output from the OR1 is input to the set terminal S of the RS flip-flop RSFF2, as shown in FIG. 5, and the output from the comparator CMP9 is input to the reset terminal R thereof, as also shown in the FIG. 5. As a result, the inverted output terminal (Q bar) of the flip-flop RSFF1 provides a high-level signal indicating a time period within the internal off time in which there is no pseudo-resonance signal, as shown in FIG. 5.

Additionally, the output from the AND1 is applied to the set terminal S of the flip-flop RSFF1, and the output of the AND2 is applied to the reset terminal R of this flip-flop, as shown in FIG. 5. As a result, the inverted output terminal (Q bar) of the flip-flop RSFF1 outputs a switching signal, as shown in FIG. 5, so that the level is low during the period of time in which the pseudo-resonance signal is being generated, and when the switching transistor Q1 is on immediately after the generation of the pseudo-resonance signal.

The low-level switching signal from the flip-flop RSFF1 is input to the charging voltage switching circuit 57. In response to this switching signal, the charging voltage switching circuit 57 sets the switching transistor Q17 to the off state and so that the voltage applied to the base of the switching transistor Q19 is generated by the added resistor of R21 and R23. As a result, the charging voltage of the capacitor C9 rises, for example, approximately 1 V (Δ V).

The operation of the voltage resonance type switching power supply 51 is described below, with reference to FIG. 5.

When the load is heavy, for example 100%, with a bottom detection circuit 55 such as shown in FIG. 3, with the output of the comparator CMP3 high, the output of the comparator CMP9 low, and the inverted output (Q bar) of the flip-flop RSFF1 high, the reset signal input to the flip-flop RSFF1 is at the low level, the reset signal input to this flip-flop causing the inverted output (Q bar) of the flip-flop RSFF1 to be at the high level. A high-level signal is therefore output from the flip-flop RSFF1 to the base of the transistor Q17.

As a result of the above, at the charging voltage switching circuit 57 the transistor Q17 goes into the on state, the point Px is grounded, and a voltage derived from voltage division of the output voltage of the voltage regulating circuit 19 by R25 and R23 (for example, 4 V) charges the capacitor C9.

If the load is light, however, such as the case of a 50% load, using the bottom detection circuit 55 shown in FIG. 3, with output of the comparator CMP3 high, the output of the comparator CMP9 low, and the output of the flip-flop RSFF1 low, the reset signal input to the flip-flop RSFF1 is at the high level, the flip-flop RSFF1 outputs a low-level switching signal, and the reset signal causes a low-level switching output signal to be output from the flip-flop RSFF1 during the period from the time at which the pseudo-resonance signal to the transistor Q17 is generated and the point in time at which the transistor Q1 comes on.

As a result of the above, at the charging voltage switching circuit 57 the transistor Q11 goes into the off state, the point Py is grounded, and a voltage derived from voltage division of the output voltage of the voltage regulating circuit 19 by R25, R23, and R21 (for example, 5 V) charges the capacitor C9. By the charging voltage V2 of the capacitor C9 rising by, for example, 1 V (Δ V), the internal off time is extended by approximately 3 μm.

As discussed above, the charging voltage for the capacitor C9 used to set the internal off time is raised, thereby extending the internal off time, so that one cycle of ringing operation occurs, thereby solving the problem occurring in the past, in which there was unstable operation caused by repeated alternation between ringing and no ringing.

Because the internal off time is extended by 3 μs for the next oscillation cycle when the load is light, it is possible to solve a problem existing in switching power supplies of the past, so that even if a long pseudo-resonance signal is received, by making the internal off time longer, the operation of one-cycle stopping is continued, thereby stabilizing operation.

According to the first aspect of the present invention, by raising the charging voltage for the capacitor determining the off time of a switching element that generates a voltage at the secondary side of a transformer so as to extend the off time, it is possible to obtain stable operation even under low-load conditions.

According to the second aspect of the present invention, by judging whether a bottom has been encountered base on the voltage on a capacitor that determines the off time of a switching element that generates a voltage at the secondary side of a transformer and a voltage that is applied to the over-current protection terminal, and switching the charging voltage applied to a capacitor when the judgment is that the bottom has not occurred, the capacitor charging voltage can be raised so as to extend the off time, thereby providing a stable output voltage even at low-load conditions.

While preferred embodiment of the present invention has been described using specific terms, such description is for illustrative purpose, and it is to be understood that changes and variations may be made without departing from the scope or spirit of the following claims.

What is claimed is:

1. A switching power supply comprising:
   a switching element, which switches a DC current supplied to a transformer from a DC power supply so as to generate a voltage at a secondary side of the transformer; and
   a capacitor determining the off time of the switching element,
   wherein when a ringing voltage is generated under a low load, at a time when the voltage is lower than a lower valley part of the voltage, the charging voltage of the capacitor is raised and the off time is extended.

2. A switching power supply comprising;
   a switching element, which switches a DC current supplied to a transformer from a DC power supply so as to generate a voltage at a secondary side of the transformer; and
   a capacitor determining the off time of the switching element, the switching power supply further comprising a bottom detection circuit, which determines whether or not a bottom has been reached based on a voltage of the capacitor and a voltage applied to an over-current protection terminal, and a charging voltage switching circuit, which, in a case in which the bottom detection circuit judges that a bottom has been exceeded, switches a voltage applied to the capacitor, and which raises the charging voltage of the capacitor when the bottom is exceeded, so as to extend the off time.

3. A switching power supply comprising;
   a switching element which switches a DC current supplied to a transformer from a DC power supply so as to generate a voltage at a secondary side of the transformer; and
   a capacitor determining the off time of the switching element, the switching power supply further comprising a bottom detection circuit which determines whether or not a bottom has been reached based on a voltage of the capacitor and a voltage applied to an over-current protection terminal, and a charging voltage switching circuit, which, in a case in which the bottom detection circuit judges that a bottom has been exceeded, switches a voltage applied to the capacitor, and which raises the charging voltage of the capacitor when the bottom is exceeded, so as to extend the off time;
   wherein the bottom detection circuit comprises:
   a first time period detection circuit which detects a first time period after which a voltage of the capacitor drops below a first reference value; and
   a second time period detection circuit which detects a second time period after which the voltage of the capacitor drops below a second reference value; and
   the switching power supply further comprising a switching signal generation circuit which generates a switching signal for a period during which bottom is set to on, outputting the switching signal to the charging voltage switching circuit.

* * * * *